United States Patent [19]

Bigret

[11] Patent Number: 4,517,822

[45] Date of Patent: May 21, 1985

[54] DEVICE FOR APPLYING IMBALANCE TO A ROTOR

[75] Inventor: Roland Bigret, Drancy, France

[73] Assignee: Alsthom-Atlantique, Paris Cedex, France

[21] Appl. No.: 552,229

[22] Filed: Nov. 16, 1983

[30] Foreign Application Priority Data

Nov. 16, 1982 [FR] France ............................... 82 19122

[51] Int. Cl.³ ............................................. G01M 1/00
[52] U.S. Cl. ....................................... 73/1 B; 73/458; 73/468
[58] Field of Search .................. 73/1 B, 458, 468, 487

[56] References Cited

U.S. PATENT DOCUMENTS

| 2,963,914 | 12/1960 | Dupouy | 73/468 |
| 3,812,724 | 5/1974 | Curtz | 73/458 |
| 4,295,387 | 10/1981 | Zhivotov | 73/468 |
| 4,348,885 | 9/1982 | Mueller | 73/1 B |

Primary Examiner—S. Clement Swisher

Attorney, Agent, or Firm—Sughrue, Mion, Zinn, Macpeak and Seas

[57] ABSTRACT

A device for applying imbalance to a rotor comprises a plurality of chambers disposed symmetrically around the rotor. Each has an opening and is adapted to contain a fluid. Each of a plurality of opening devices associated with the chambers is operable under remote control so as to open the opening of the associated chamber, so that the fluid contained in it may be evacuated from it. Each opening device comprises a pyrotechnic valve incorporating a piston rigidly attached to an assembly and movable from a first position in which the assembly closes the opening of the associated chamber to a second position in which the assembly opens the opening. Such movement is obtained in response to firing of the pyrotechnic valve. The opening device also includes a control circuit which incorporates a receiver responsive to a signal transmitted from a fixed source with no material transmission medium. This control circuit fires the pyrotechnic valve. In this way, imbalance can be applied in an instantaneous manner, so that the coefficients of influence can be accurately and reliably measured.

2 Claims, 5 Drawing Figures

DEVICE FOR APPLYING IMBALANCE TO A ROTOR

BACKGROUND OF THE INVENTION

1. Field of the Invention

The present invention relates to a device for applying imbalance to a rotor.

2. Description of the Prior Art

It is known that to balance rotors by the coefficients of influence method it is necessary to add imbalance to the rotor in order to carry out measurements with and without the imbalance.

To add imbalance it is necessary to stop the rotor, as a result of which the measurements carreid out with and without imbalance are separated by a number of hours or even days and, by virtue on the one hand of the time lapse and on the other hand of the fact that the rotor has been stopped, the coefficient of influence deduced from the measurements may be different from the true coefficient of influence (see FIG. 1).

There exists a device known from document DE-A No. 3102726 permitting imbalance to be applied to a rotor without stopping the latter, said device comprising, on the one hand, a plurality of chambers disposed symmetrically around the rotor, said chambers being adapted to contain a fluid and provided with an opening, and, on the other hand, a plurality of opening devices associated with the chambers, each device being remotely controllable via a wire to open the opening in the associated chamber, so that the fluid contained may be evacuated.

In the known device, the opening devices are controlled via wires wound on the rotor, which raises major problems of implementation due to centrifugal force and the environment (water vapor, water, etc.) resulting in unreliable results with regard to transmission of commands. Also, it is extremely difficult when the rotor is not drilled to connect these wires to the exterior through the intermediary of a rotary contact assembly.

SUMMARY OF THE INVENTION

The device in accordance with the invention, enabling these disadvantages to be overcome, is characterized in that the opening device comprises, on the one hand, a pyrotechnic valve incorporating a piston rigidly attached to an assembly and movable from a first position wherein said assembly closes said opening of an associated chamber to a second position wherein said assembly opens said opening in response to firing of said pyrotechnic valve, and a control circuit incorporating a receiver responsive to a signal transmitted from a fixed source without a material transmission medium by firing said pyrotechnic valve.

In a particularly simple embodiment of the invention, the receiver is a photothyristor and the fixed source is a light source.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

Figure 1:
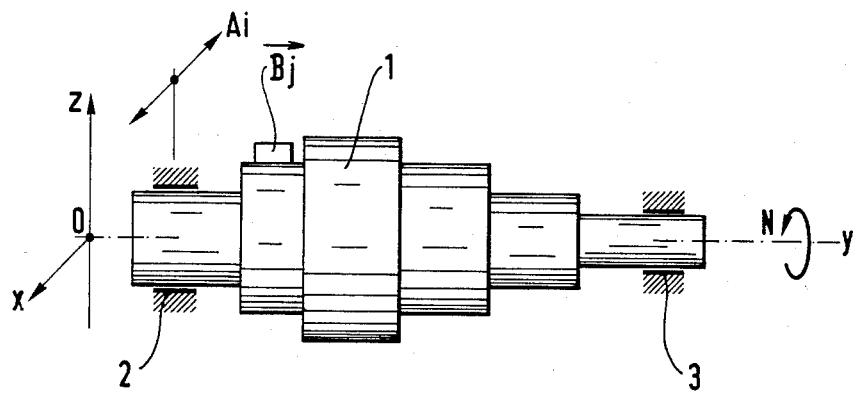
FIG. 1 is a schematic representation of a turbine rotor to which imbalance may be applied.

In FIG. 1, to illustrate the coefficients of influence measurement method, there is shown a rotor 1 with horizontal axis Oy defined relative to three orthogonal axes Oxyz, mounted on two bearings 2 and 3. The vibrational behavior of the rotor is indicated, by way of example, by the vibration Ai of the bearing 2 in the direction Ox.

$\tau_o$ designates the torque of the initial imbalance to be compensated, for rotation speed N.

At time to, this torque generates vibration Aio.

The fundamental frequency of this vibration is equal to the rotation speed. Its phase is defined relative to the fundamental component of a periodic signal produced by a fixed sensor responsive to the passage of a fixed marker on the rotor.

In the balancing plane Pj perpendicular to Oy there is added an imbalance Bj (mass mj at distance Rj from axis Oy of rotor 1 in angular position $\theta j$ relative to a marker rigidly attached to the rotor, Bj=mj Rj).

At time t'o, the torque $\tau'o + Bj$ generates the vibration Ai.

If to and t'o are very close, the coefficient of influence of the balancing plane Pj on the vibration Ai is defined by the equation:

$$Cij = \frac{\vec{Ai} - \vec{Aio}}{\vec{Bj}} \quad (1)$$

Because of the lapse between to and t'o and, moreover, because of the fact that the rotor must be stopped to apply the imbalance Bj, $\tau o$ and $\tau'o$ may be different, as a result of which the coefficient of influence computed by application of equation (1) may be different from the true coefficient of influence.

Figure 2:
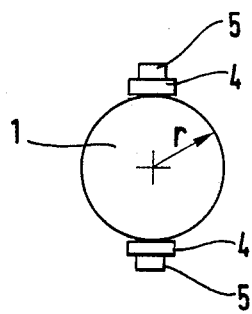
FIG. 2 represents a cross-section through the rotor equipped with the device in accordance with the invention.

FIG. 2 shows the device in accordance with the invention. This device comprises two identical chambers 4 attached to the rotor at diametrically opposite points.

An opening device 5 in accordance with the invention is attached to each chamber 4.

Figure 3:
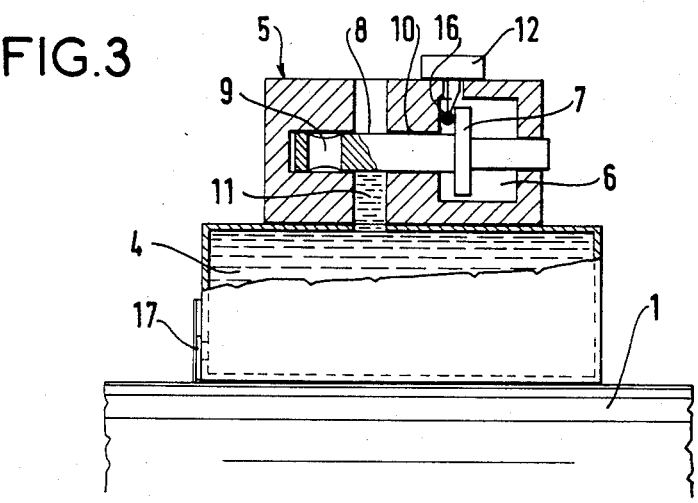
FIGS. 3 and 4 show two detailed views of a chamber with its associated opening device in accordance with the invention.
Figure 4:
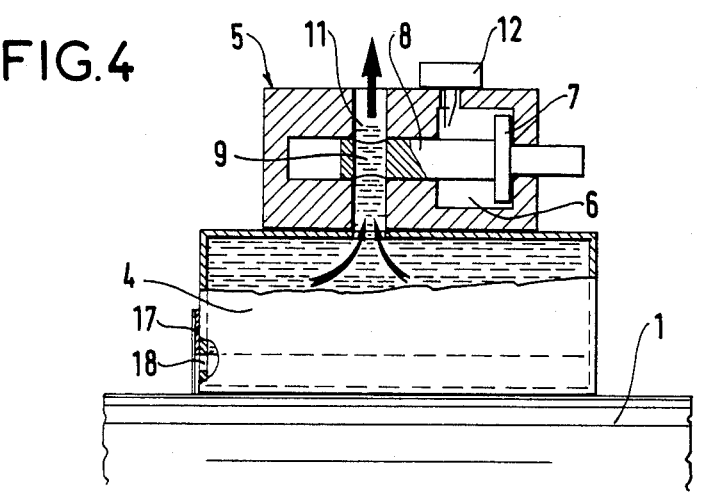

The device 5 is shown in detail in FIGS. 3 and 4.

The opening device 5 is mounted on the chamber 4 and comprises a pyrotechnic valve 6 the piston 7 of which slides parallel to the axis of the rotor between a first position (FIG. 3) and a second position (FIG. 4).

An assembly 8 rigidly attached to the piston 7 and provided with an orifice 9 slides in a housing 10 which spans the opening 11 in the chamber 4.

In the first position of the piston, the assembly 8 closes the opening 11 (FIG. 3) and in the second position the orifice 9 is in line with the opening 11.

The device 5 also comprises a control circuit 12 used to detonate the explosive 16 contained under the piston 7 in its first position.

Figure 5:
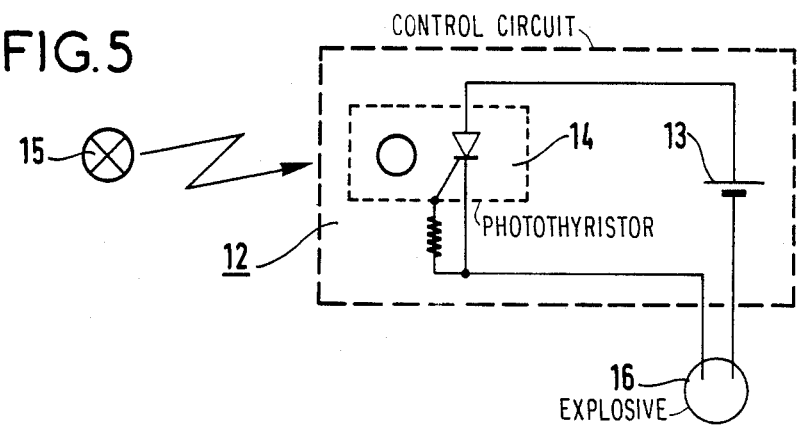
FIG. 5 shows a control circuit for the opening device shown in FIGS. 3 and 4.

The circuit 12 (FIG. 5) comprises a battery 13 and a photothyristor 14. When the photothyristor 14 receives light from a light source 15, it fires and current from the battery detonates the explosive 16.

The two chambers contain water or another suitable fluid (such as oil, for example) of mass m.

When a light beam is directed onto the photothyristor of an opening device 5, the opening in the associated chamber is opened and the water is evacuated under the effect of centrifugal force.

The photothyristors of opening devices are set off axially or radially and associated each with a light source in order to trigger them in the desired order. Chambers 4 have on their lateral wall a hole 18 with an exhaust flap 17 which is closed when rotor is still and which opens when rotor is rotating.

The instantaneous imbalance applied to the rotor is equal to mr, where r is the radius of the rotor 1 in line with the chambers 4.

For a high-power steam turbine with $r = 0.5$ m a value $m = 0.8$ kg may be assumed by way of example.

By evacuating the fluid from the first chamber and then the fluid from the second chamber, two imbalance may be applied to provide confirmation of the results.

The time-delay between the initiation of evacuation of the water and the measurement of the vibration may be of the order of 10 seconds. Because of this short time-delay, it is possible for $\tau'o = \tau o$.

It will be understood that various changes in the details, materials and arrangements of parts, which have been herein described and illustrated in order to explain the nature of the invention, may be made by those skilled in the art within the principle and scope of the invention as expressed in the appended claims.

For example, the photothyristor could be replaced with any wireless remote control system (frequency modulation telemetry system, rotary transformer, etc.).

There is claimed:

1. A device for applying imbalance to a rotor, comprising a plurality of chambers disposed symmetrically around said rotor and having an opening and adapted to contain a fluid, an opening device associated with each of said chambers and means for operating said opening devices under remote control so as to open said opening of an associated chamber so that fluid contained therein may be evacuated therefrom, each opening device comprising a pyrotechnic valve including a piston rigidly attached to an assembly and means for mounting said assembly relative to said opening for movement from a first position, wherein said assembly closes said opening of an associated chamber to a second position wherein said assembly opens said opening in response to firing of said pyrotechnic valve, and a control circuit incorporating a receiver responsive to a signal transmitted from a stationary source without a material transmission medium to fire said pyrotechnic valve.

2. A device according to claim 1, wherein said receiver is a photothyristor and said stationary source is a light source.

* * * * *